US008001470B1

(12) United States Patent
Chen et al.

(10) Patent No.: US 8,001,470 B1
(45) Date of Patent: Aug. 16, 2011

(54) HELP FUNCTIONALITY AND GRAPHICAL USER INTERFACE APPLICATIONS

(75) Inventors: Simon S. Chen, San Jose, CA (US); Timothy W. Strickland, San Francisco, CA (US); Philip Guindi, Palo Alto, CA (US); Britt Miura, Menlo Park, CA (US)

(73) Assignee: Adobe Systems, Inc., San Jose, CA (US)

( * ) Notice: Subject to any disclaimer, the term of this patent is extended or adjusted under 35 U.S.C. 154(b) by 1132 days.

(21) Appl. No.: 11/786,039

(22) Filed: Apr. 9, 2007

(51) Int. Cl.
G06F 3/00 (2006.01)
G06F 3/048 (2006.01)

(52) U.S. Cl. ........ 715/714; 715/705; 715/708; 715/712; 715/810

(58) Field of Classification Search .................. 715/714, 715/708, 705, 810, 712, 713; 707/707
See application file for complete search history.

(56) References Cited

U.S. PATENT DOCUMENTS

| | | | | |
|---|---|---|---|---|
| 5,581,684 | A * | 12/1996 | Dudzik et al. | 715/708 |
| 5,877,757 | A * | 3/1999 | Baldwin et al. | 715/705 |
| 6,199,061 | B1 * | 3/2001 | Blewett et al. | 1/1 |
| 6,236,989 | B1 * | 5/2001 | Mandyam et al. | 1/1 |
| 6,456,303 | B1 * | 9/2002 | Walden et al. | 715/705 |
| 6,542,163 | B2 * | 4/2003 | Gorbet et al. | 715/711 |
| 6,587,121 | B1 * | 7/2003 | Nelson et al. | 715/705 |
| 6,690,390 | B1 * | 2/2004 | Walters et al. | 715/705 |
| 6,920,612 | B2 * | 7/2005 | Makinen | 715/705 |
| 6,959,294 | B2 * | 10/2005 | Sullivan et al. | 706/50 |
| 7,024,658 | B1 * | 4/2006 | Cohen et al. | 717/117 |
| 7,415,696 | B2 * | 8/2008 | Cohen et al. | 717/100 |
| 7,543,232 | B2 * | 6/2009 | Easton et al. | 715/708 |
| 7,594,176 | B1 * | 9/2009 | English | 715/708 |
| 2004/0255234 | A1 * | 12/2004 | Methot | 715/500 |
| 2006/0117315 | A1 * | 6/2006 | Bussert et al. | 717/174 |
| 2006/0129931 | A1 * | 6/2006 | Simons et al. | 715/705 |
| 2006/0294050 | A1 * | 12/2006 | McRoberts et al. | 707/1 |
| 2007/0277104 | A1 * | 11/2007 | Hennum et al. | 715/705 |
| 2008/0229199 | A1 * | 9/2008 | Richardson et al. | 715/714 |

* cited by examiner

*Primary Examiner* — Tadeese Hailu
*Assistant Examiner* — Nicholas S Ulrich
(74) *Attorney, Agent, or Firm* — Kilpatrick Townsend & Stockton LLP (57) ABSTRACT

A computer system executes a host application that generates a graphical user interface for display on a respective user's display screen. In addition to executing the host application, the computer system (or other computer) provides an environment for executing a so-called help agent (e.g., a plug-in module) associated with the host application. The help agent can initiate display of a help window along with a graphical user interface displayed by the host application. Depending on the embodiment, the help agent can provide one or more functions such as retrieval and display of help information links in the help window to different types of help information, application of commands to the graphical user interface application via input with respect to the help window, and viewing of application hint information in the help window.

18 Claims, 9 Drawing Sheets

HELP FUNCTIONALITY AND GRAPHICAL USER INTERFACE APPLICATIONS

BACKGROUND

Software vendors typically include a help function for use in a corresponding graphical user interface application. As well known, the help function attempts to teach a respective user of the host application how to use different features supported by the host application.

As an alternative to help functionality provided by a respective software vendor, a user can initiate a search on the Internet to find help information available on-line to learn about different functionality supported by vendor software. According to such methods, the user must view a list of available websites and search by trial and error to find useful help information.

SUMMARY

Conventional techniques for providing help information suffer from a number of deficiencies. For example, conventional techniques enable a respective application user to search through an index of locally stored help information for a number of different topics. However, searching through an index to find appropriate help information can be quite tedious. Even if the user is successful finding the appropriate help information about a given topic, there is no guarantee that the help information will be useful to the user because vendor's do not always have a sufficient budget to produce robust help functions for their applications. As mentioned above, the user can attempt to find help information available on the Internet. However, this can be tedious because a user's search request must be precisely crafted to produce useful search results. Thus, the Internet is one commonly used to find online content, but this doesn't guarantee high quality, context specific results. Note also that use of the Internet also requires the user to leave a current application to perform a respective on-line search.

Conventional help techniques tend to cover product functionality. For example, most conventional help information is directed towards teaching a user how to use a single feature of an application. However, users often want help with actual workflows, which cover more than just information indicating how to use a given application feature.

The present disclosure recognizes that help functionality provided to an application user can be much broader than the typical feature-functionality descriptions usually covered in company-based Help systems. For example, embodiments herein include a holistic view of Help, and recognize that it can include tutorials (in various forms), feature descriptions, sample files, forum discussions, question and answers, etc. The architecture as described herein is flexible enough to allow us to just keep adding new forms of Help. As described herein, techniques herein enable use of all types of help sources including vendor generated help information as well as community generated help information.

As mentioned above, techniques discussed herein deviate with respect to conventional applications such as those discussed above as well as other techniques known in the prior art. For example, in a specific embodiment as further described herein, a computer system executes a host application that generates a graphical user interface for display on a respective user's display screen. In addition to executing the host application, the computer system (or another computer system) executes a so-called help manager (e.g., a plug-in module or agent software) associated with the host application to provide novel help functionality as described herein.

The help manager according to embodiments herein can provide a number of functions. For example, based on a command from the respective user, the help manager can support generation of a help window on the display screen along with the graphical user interface displayed by the host application. A communication link between the help manager and the host application supports bi-directional communications such that the help manager can communicate with the host application and the host application can communicate with the help manager.

In one embodiment, the help agent is configured to communicate over a network and collect help information and/or links (e.g., help information links, tutorial information, etc.) from one or more respective sources (e.g., one or more remote servers, a local repository, etc.) for display as a list of selectable help options in a displayed help window. Accordingly, a respective user viewing the help window can use the links to obtain different types of help information describing how to carry out different functions associated with the graphical user interface.

Further, the help agent or help manager can be configured to monitor user activity associated with the graphical user interface and display different types of help information in the help window depending on a current context selected by the user. For example, according to one configuration, the help manager automatically updates the information displayed in the help window depending on the user's current activity such that the help window displays help information and/or updates a set of displayed links to help information associated with the currently selected tool or function. Thus, the user can apply different operations to the host application and, if desired, view current help information displayed in the help window or click on a help link in the help window to retrieve help information.

These and other embodiments will be discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as providing help management functions. The instructions, when carried out by a processor of a respective computer device, cause the processor to: i) initiate display of a help window associated with a graphical user interface application; ii) receive a request for help information associated with the graphical user interface application based on input with respect to the help window; and iii) in response to receiving the request, communicate with a remote server over a network to retrieve multiple links pointing to available help information (e.g., community generated help information, vendor generated help information, etc.) and display the multiple links as a list of selectable links in the help window enabling retrieval of help information from multiple sources including at least one help information source at a remote location over the network. The numbering of the steps has been added for clarity sake, these steps need not be performed in any particular order.

Other embodiments of the present disclosure include software programs to perform any of the method embodiment steps and operations summarized above and disclosed in detail below.

Also, it is to be understood that the system, method and apparatus herein can be embodied strictly as a software program, as a hybrid of software and hardware, or as hardware alone such as within a processor, or within an operating system or a within a software application. Example embodiments of the invention may be implemented within products and/or software applications such as those manufactured by Adobe Systems, Inc. of San Jose, Calif., USA.

As discussed above, techniques herein are well suited for use in software applications implementing help functionality. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment as described herein, a computer system executes a host application that generates a graphical user interface for display on a respective user's display screen. In addition to executing the host application, the computer system (or other computer) provides an environment for executing a help agent (e.g., a help manager such as a plug-in module) associated with the host application. The help agent can initiate display of a help window for display along with a graphical user interface displayed by the host application. Depending on the embodiment, the help agent can provide one or more functions such as retrieval and display of help information links in the help window to different types of help information. Additional embodiments enable application of commands to the graphical user interface application via an input with respect to the help window and/or viewing of application hint information in the help window.

Figure 1:
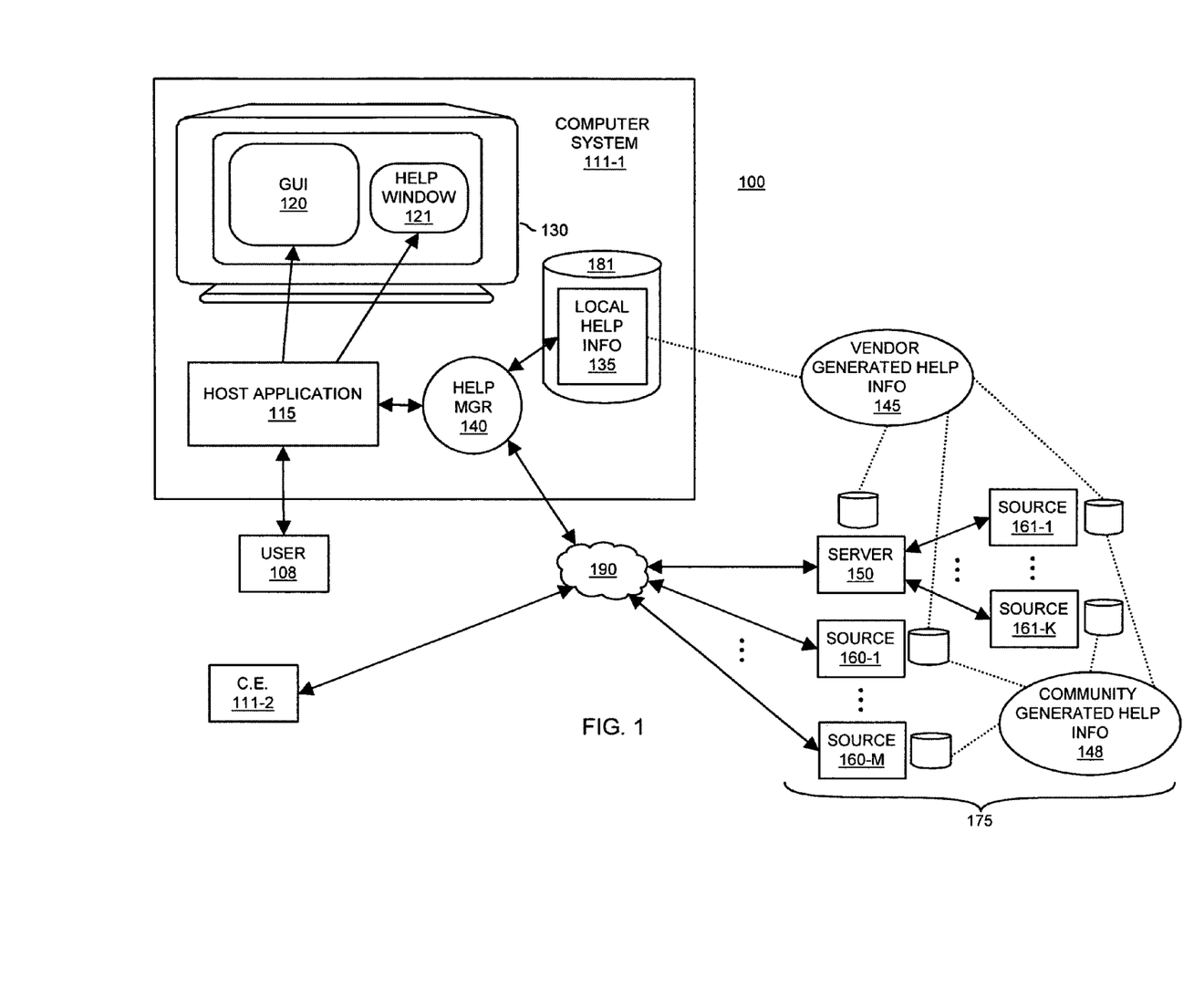
FIG. 1 is an example diagram of a computer environment providing help functionality according to embodiments herein.

FIG. 1 is a diagram of a computer environment 100 enabling different types of help functionality according to embodiments herein. As shown, computer environment 100 includes computer systems 111 (e.g., computer system 111-1, computer system 111-2, etc.), network 190 (e.g., a publicly accessible network such as the Internet), server 150, sources 160 (e.g., source 160-1, . . . , source 160-M), and sources 161 (e.g., source 161-1, . . . , source 161-M). Computer system 111-1 includes a display screen 130 for displaying graphical user interface 120 and help window 121, host application 115, help manager 140 (e.g., a software agent or plug-in module), and repository of local help information 135.

In general, user 108 provides input to host application 115 executing on computer system 111-1. Host application 115 can be any type of application (e.g., text editor application, photo editor application, etc.) such as one that generates a graphical user interface 120 for display on display screen 130.

In response to input (e.g., commands) provided by user 108 via a mouse, keyboard, etc., the host application 115 carries out corresponding commands by performing operations and, depending on a received command, display appropriate information on display screen 130 for viewing by user 108. Commands received by host application 115 can include opening and closing files, applying editing tools to create content for an opened file, setting of configurations, etc.

In addition to supporting the functions as mentioned above, graphical user interface 120 can include one or more display regions (e.g., buttons, icons, pull-down menus, etc.) enabling a respective user 108 to open help window 121 for display on display screen 130. In one embodiment, the help manager 140 (e.g., software code) can be launched in response to receiving a request (e.g., activation of a button, icon, etc.) by the user 108 to open the help window 121. In another embodiment, the host manager 140 can be running prior to receiving such a request by the user to open the help window 121. For example, the help manager 140 can be launched in response to execution of the host application 115. In this latter embodiment, upon receipt of a request to open the help window 121, the help manager 140 can initiate display (e.g., via communications with the host application 115) of the help window 121 for viewing by user 108.

As mentioned above, the help manager 140 can be a software agent or plug-in module associated with host application 115. Thus, help manager 140 can be an independent entity (with respect to host application 115) running on computer system 111-1 that communicates with host application 115 to carry out functions such as displaying and/or populating help window 121 on display screen 130 with help information. The help information can be retrieved from remote entities such as local and/or remote repositories that provide useful help information describing functionality associated with host application 115.

In one embodiment, the help manager 140 and/or host application 115 is configured to include a flash player. Accordingly, the help manager 140 can retrieve and playback multi-media content (e.g., .SWF files supporting animated pictures, sound, video, etc.) for user 108.

Help manager 140 can populate help window 121 with different types of available information such as vendor-generated help information 145 (e.g., help information generated by or financed by the vendor associated with host application 115) retrieved from the repository of local help information 135 and/or vendor generated help information 145 retrieved from remote entities over network 190 such as server 150, sources 160, and sources 161.

Vendor generated help information 145 can include "how-to" tutorials, application hints, troubleshooting information, etc. enabling a user 108 to carry out different functions associated with graphical user interface 120. As illustrated, the vendor generated help information can be distributed throughout different locations in computer environment 100. For example, vendor generated help information 145 can be stored in repository 181 (as local help information 135), as well as stored at any of the remote storage locations such as server 150, sources 160, and sources 161.

The vendor-generated help information 145 can be stored locally at repository 181. This type of help information is typically installed by a host application installer function associated with host application 115. The same or most likely updated version of the vendor-generated help information 145 could be posted on a remote storage location such as server 150, after the host application ships. The help manager 140 can be configured to reconcile the local and online version of the vendor-generated help 145 on a specific help topic and links the relevant help content to the most up-to-date version when the user 108 has a corresponding network connection. This technique can be applied to locally cached community generated content (e.g., help information or other information) as well. Accordingly, embodiments herein include help manager 140 supporting operations of detecting that help information associated with a topic as specified by a request can be found in a local repository and a remote repository over the network; identifying that the remote repository has newer help information associated with the topic than the local repository; and initiating display of a link to the newer help information in the remote repository. Of course, if the local repository stores newer help information, then the help manager provides a link to the newer help information in the local repository.

In addition to having the capability of displaying or providing access to vendor generated help information and corresponding links in help window 121, help manager 140 can populate help window 121 based on other types of help information such as community generated help information 148 stored locally in computer system 111-1 or retrieved over network 190 from remote entities such as such as server 150, sources 160, and sources 161. For example, depending on commands inputted by a respective user 108, the help manager 140 can retrieve help information (e.g., community generated help information) available at remote locations for display in help window 121. The help information can be free or can be pay per view content requiring payment of a fee as its name suggests. Additionally, the help information can be syndicated content as well.

As will be discussed later in this specification, the help manager 140 can be configured to monitor a status of the graphical user interface 120. In response to detecting a currently selected function (e.g., as specified by user input) associated with the graphical user interface 120 or host application 115, the help manager 140 automatically populates a portion of the help window 121 with a visual indicator specifying the currently selected function. In addition to providing an indication of the currently selected function, the help manager 140 can repeatedly update a list of selectable links in the help window 121 with links to community generated help information associated with the currently selected function.

A triggering event to update the help window 121 with new links or help information can be user selection of a different function associated with host application 115. For example, when a user 108 selects a function such as drawing lines in a drafting tool, the help window 121 can be updated to includes links and/or help information associated with drawing lines; when a user selects a function such as bolding text displayed in the graphical user interface 120, the help manager 140 can automatically update the help window 121 to include help information and corresponding help information links to associated with the bolding function supported by the host application 115; and so on.

Figure 2:
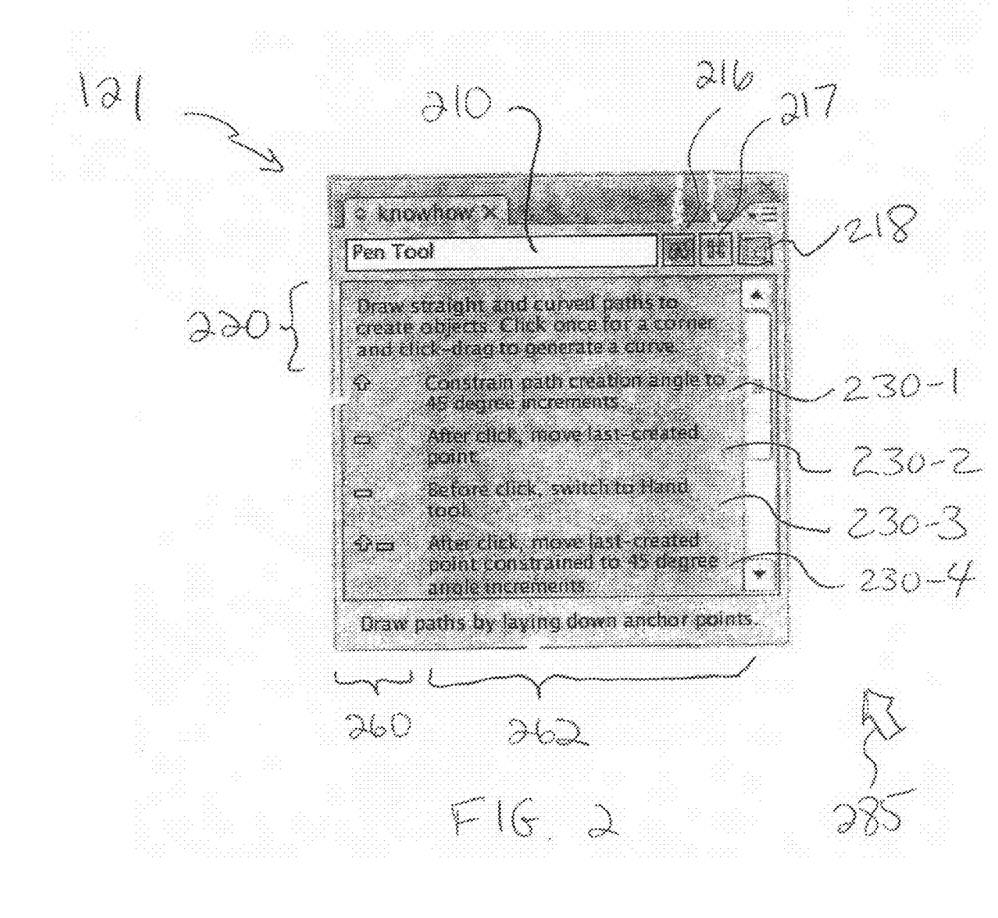
FIG. 2 is an example diagram of a help window illustrating a selected function as well as a corresponding list of applicable mode settings according to embodiments herein.

FIG. 2 is a diagram illustrating help window 121 according to embodiments herein. As shown, help window 121 includes display field 210 identifying a currently selected function (e.g., a Pen Tool) associated with host application 115.

Help window 121 includes selectable display regions enabling a respective user 108 to carry out different functions associated with host application 115 via selection tool such as cursor 285. For example, user controlled cursor 285 can be used to click on search button 216, which enables a respective user 108 to display a list of one or more help information links. The details associated with search button 216 will be more particularly discussed with respect to FIG. 3.

Referring again to FIG. 2, user controlled cursor 285 can be used to click on hints button 217, which enables a respective user 108 to display a listing of shortcut keys 260 and corresponding descriptions 262 of different selectable modes 230 (e.g., mode 230-1, mode 230-2, mode 230-3, mode 230-4, etc.) associated with the currently selected function (e.g., Pen Tool) as specified by contents of the display field 210. Description 220 describes functionality associated with the currently selected tool as specified by display field 210.

In addition to the "follow me" function that is achieved by automatically updating the display field 210 with the currently selected host application function, the user 108 also can type in a text string identifying a currently non-selected function associated with host application 115. In response to such an action and clicking on the search button 216, the help manager 140 can initiate retrieval of appropriate description 220 and mode 230 information associated with the identified function. In an advanced embodiment, the help manager 140 can be configured to notify the host application 115 of the newly selected function as specified by a text string inputted by the user 108 in display field 210. The host application 115 can set the current tool to the value as specified by display field 210. Accordingly, this is one way the help window 140 can be used to receive input commands at the help manager 140 and forward the received input commands from the help manager 140 to host application 115 that, in turn, sets the host application to the appropriate selected function. Techniques herein provide flexibility over conventional methods because conventional methods do not enable a user 108 to control functionality associated with a host application via input of commands to a help window.

As previously discussed, a respective user 108 can select different functions associated with host application 115 via input with respect to host application 115. For each newly selected function as detected by the help manager 140, the help manager 140 automatically updates the display field 210 with an appropriate text string identifying the newly selected function as well as updates the listing of different modes 230 to those associated with the newly selected host application function. Accordingly, the user can view the different selectable modes 230 associated with the currently host application function without repeatedly being tasked with clicking on an index in the help window 121 to view appropriate locally stored help information to identify a different corresponding set of possible modes (e.g., shortcut keys 260). One advantage of using the help manager 140 according to embodiments herein is that user 108 directly interacts with host application 115 just as he/she normally would in conventional applications. Without explicitly interacting between the user 108 and the help manager 140 or help window 121, the help manager 140 is able to automatically deliver the relevant help in the help window 121.

In the context of the present example, help window 121 enables a respective user 108 to select different modes associated with a currently selected function such as Pen Tool as specified by display field 210. As discussed, selection of this host application function can be made by a user 108 typing a text string in display field 210 or a respective user inputting commands to graphical user interface 120 (e.g., clicking on a corresponding pen tool button or entry in a pull-down menu that initiates activation of the pen tool function).

The user 108 also can control the different modes associated with a currently selected tool via conventional methods such as providing input to graphical user interface 120 to set a respective mode of, for example, the pen tool. In one embodiment, the help manager 140 is configured to monitor the graphical user interface 120 and/or host application 115 to identify when the user 108 initiates a mode setting other than through the help window 121. In response to detecting that the user applies a given shortcut key to the currently selected tool (e.g., pen tool), the help manager 140 initiates highlighting of the appropriate selected mode 230 in help window 121 to provide an indication to the user of his selection. Accordingly, help window 121 can be configured to enable setting of different host application modes as well as provide a visual indication of different modes that are currently in use.

Thus, during a time when displaying the list of application hints as shown in FIG. 2, the help manager 140 can receive input through the graphical user interface application 120 (or host application 115) from a respective user 108 activating one of multiple modes associated with the currently selected function. In response to receiving the input, the help manager 140 provides a visual indication in the help window 121 to identify which of the multiple modes 230 as shown in a list of application hints is currently being activated by the respective user for the currently selected function.

The help manager 140 populates the help window 121 to include a listing of the different modes associated with the currently selected function. Based on input such as clicking one of modes 230 via cursor 285, the respective user 108 is able to select a mode of the pen tool. When selected, current activity via use of the pen tool in graphical user interface 120 will be carried out according to the selected mode. Of course, a current mode of the pen tool can be easily changed by the respective user 108 clicking on another one of modes 230 displayed in the help window 121. In such an instance, the help manager 140 receives the command for the new mode setting and notifies the host application 115 of such a selection.

In one embodiment, the help manager 140 initiates display of a visual indication (e.g., via highlighting, marking, etc.) in the help window 121 to identify which of the multiple modes 230 is currently applied to the host application function indicated in display field 210. For example, if the user 108 clicks on mode 230-2, the help manager 140 would highlight mode 230-2 (e.g., the corresponding shortcut key and description) to indicate that it is the currently selected mode for the pen tool. This is another example how the help window 121 can provides user-generated input commands to the help manager 140 that are, in turn, forwarded to the host application 115.

Lastly, note that configuration button 218 enables a respective user to initiate display of one or more dialog boxes for setting configuration information for the currently selected function as specified by the contents of display field 210 (and potentially the selected mode 230 as well). For example, in lieu of clicking on function presented by graphical user interface 120, the respective user 108 can click on configuration button 218 to initiate display of a dialog box to control settings associated with the currently selected function. This feature can be useful in cases where the user 108 does not know how to operate the graphical user interface 120 and initiate display of the appropriate dialog box. This is an example of how the help window 121 can provides user-generated input commands to the help window 121 (help manager 140) that are, in turn, forwarded to the host application 115 for execution.

Figure 3:
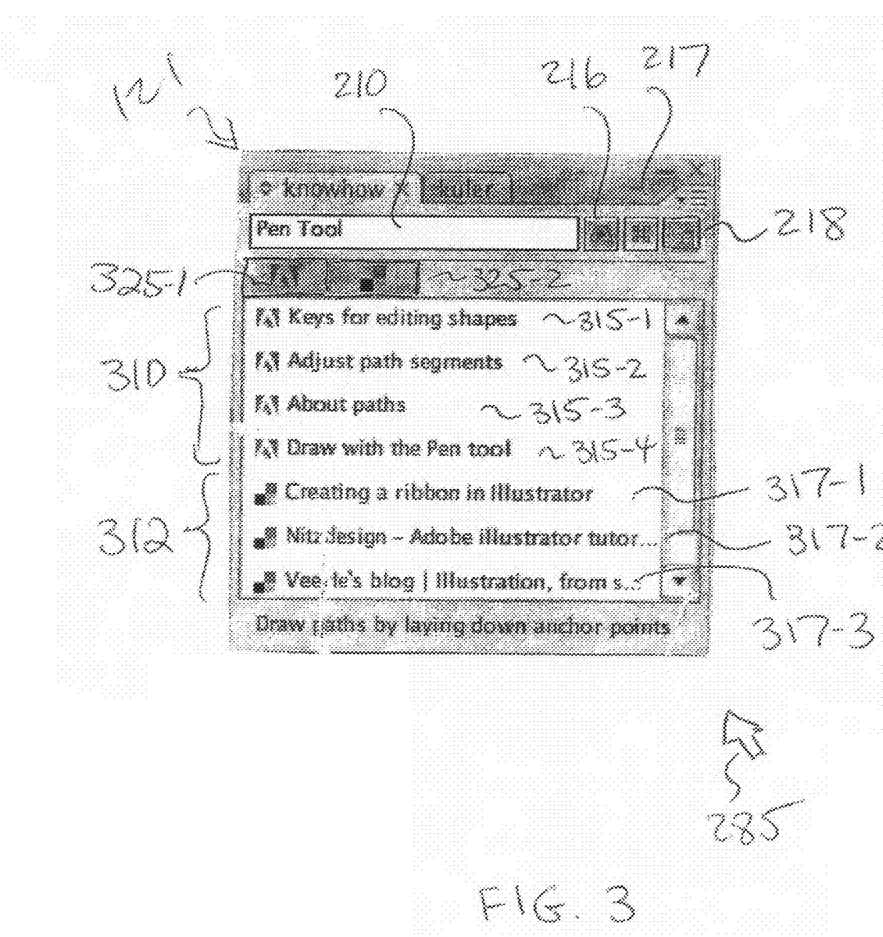
FIG. 3 is an example diagram of a help window illustrating a list of selectable links to help information according to embodiments herein.

FIG. 3 is a diagram of a help window 121 populated with information according to embodiments herein. As shown, display field 210 indicates a currently selected function associated with the graphical user interface 120. In response to a user 108 clicking on search button 216, the help manager 140 communicates with local repository 181 of help information and/or communicate over network 190 with server 150. Repository 181 and server 150 each can provide one or more help information links to help information stored at locations such as repository 181, sources 160 and sources 161. As previously discussed, the help information links provided by server 150 and/or repository 181 can include links to different types of help information such as vendor generated help information 145 and/or community generated help information 148.

As shown in FIG. 3, help window displays a first group 310 of help information links including selectable links 315 (e.g., link 315-1, link 315-2, link 315-3, and link 315-4) to vendor generated help information stored in local repository 181. Such links can also point to help information stored at remote locations such as over network 190. A user 108 can click on a respective one of links 315 to retrieve information about a type of information as specified by the link. For example, the user 108 can click on link 315-1 to obtain help information describing keys for editing shapes via the pen tool, link 315-2 to obtain help information describing how to adjust path segments via the pen tool, and so on.

In addition to links 315, help manager also initiates display of a second group 312 of selectable links 317 (e.g., link 317-1, link 317-2, link 317-3, etc.) in help window 121. The links 317 point to community generated help information 148 stored locally in repository 181 or stored remotely at locations such as server 150, sources 160, and sources 161. A user 108 can click on a respective link 317 to retrieve information about the pen tool. For example, the user 108 can click on link 317-1 to obtain help information produced by Nitz design, and so on.

Each link in a corresponding grouping of links (e.g., links 315 and links) 317 can include a symbol to indicate an origin of the link so that the respective user 108 can distinguish and choose between links based on the origin. For example, each of links 315 includes a symbol indicating that the link is to vendor generated help information. Each of links 317 includes a symbol indicating that the link is to community generated help information. Accordingly, one embodiment herein includes providing a visual indication to distinguish between the first group 310 of links 315 and the second group 312 of links 317 so that a respective user 108 can distinguish and choose between viewing of vendor generated help information 145 and community generated help information 148.

The user 108 can click on filter 325-1 to display only links 315 in help window 121 or click on click on filter 325-2 to display only links 317 in help window 121. Thus, the respective user 108 can choose which links to view in help window 121. Accordingly, one embodiment herein includes providing a filter function (e.g., filter 325) in the help window 121 enabling a user 108 of the graphical user interface 120 to choose which of the groupings of selectable links to display in the help window 121.

Simultaneous (e.g., side-by-side) display of search button 216, hints button 217, and configuration button 217 enables a respective user 108 to easily switch between viewing of help information associated with the currently selected tool. For example, for a currently selected tool associated with the graphical user interface 120 as specified by display field 210 in the help window 121, the help manager 140 enables a user to easily choose between displaying the list of selectable links 315 and 317 (as shown in FIG. 3) to retrieve remotely available help information associated with the currently selected tool and displaying a list of application hints (as shown in FIG. 2) describing how to implement different operational modes associated with the currently selected tool (e.g., pen tool).

Use of help manager 140 and server 150 simplifies management of help information for distribution to each of multiple users. For example, the help manager 140 relies at least in part on feedback from server 150 to provide help information or corresponding help information links to the different users. Thus, server 150 can be updated to provide different and/or more relevant help information as more help information is generated over time.

In one embodiment, the server 150 relies on information from a publicly accessible social bookmarking system or website (e.g., one or more of sources 161) to identify which of different possible websites (e.g., of help information, tutorials, etc.) provide most popular and/or valuable help information associated with corresponding supported host application functions. The social bookmarking system can enable searching of bookmarks which are associated with given "tags", and rank the resources by the number of users which have bookmarked them. Thus, help manager 140 can use information provided by the publicly accessible bookmarking system to produce the list of selectable links 317 in help window 121.

Figure 4:
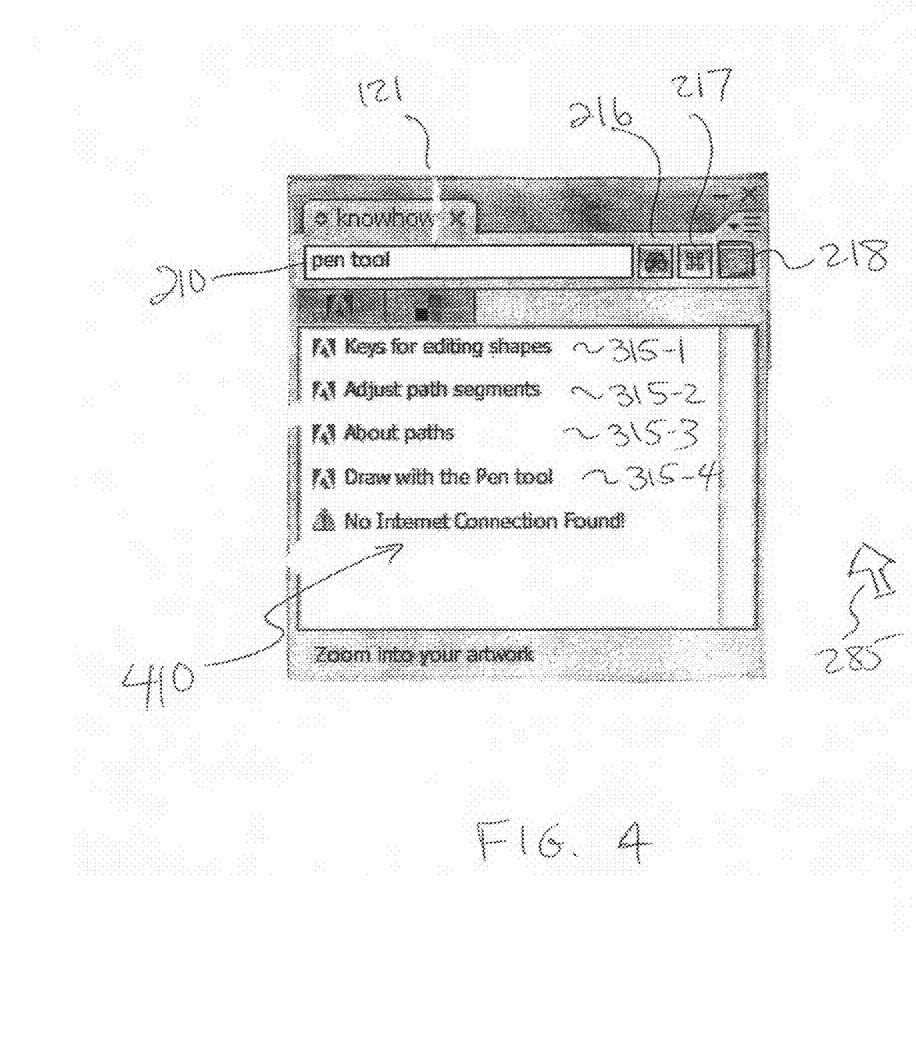
FIG. 4 is an example diagram of a help window illustrating a list of selectable links to help information as well notification of an inability to retrieve help links from a remote source over a network connection according to embodiments herein.

FIG. 4 is an example diagram of help window 121 according to embodiments herein. As previously discussed, the help manager 140 can attempt to communicate over network 190 for purposes obtaining help information links for display in help window 121. In certain cases, the help manager 140 may not be able to initiate communications over network 190 to server 150. If an attempt to communicate is unsuccessful, the help manager 140 provides notification 410 in the help window 121 that the attempted retrieval of one or more help information links failed as a result of an inability to communicate over the network 190.

Figure 5:
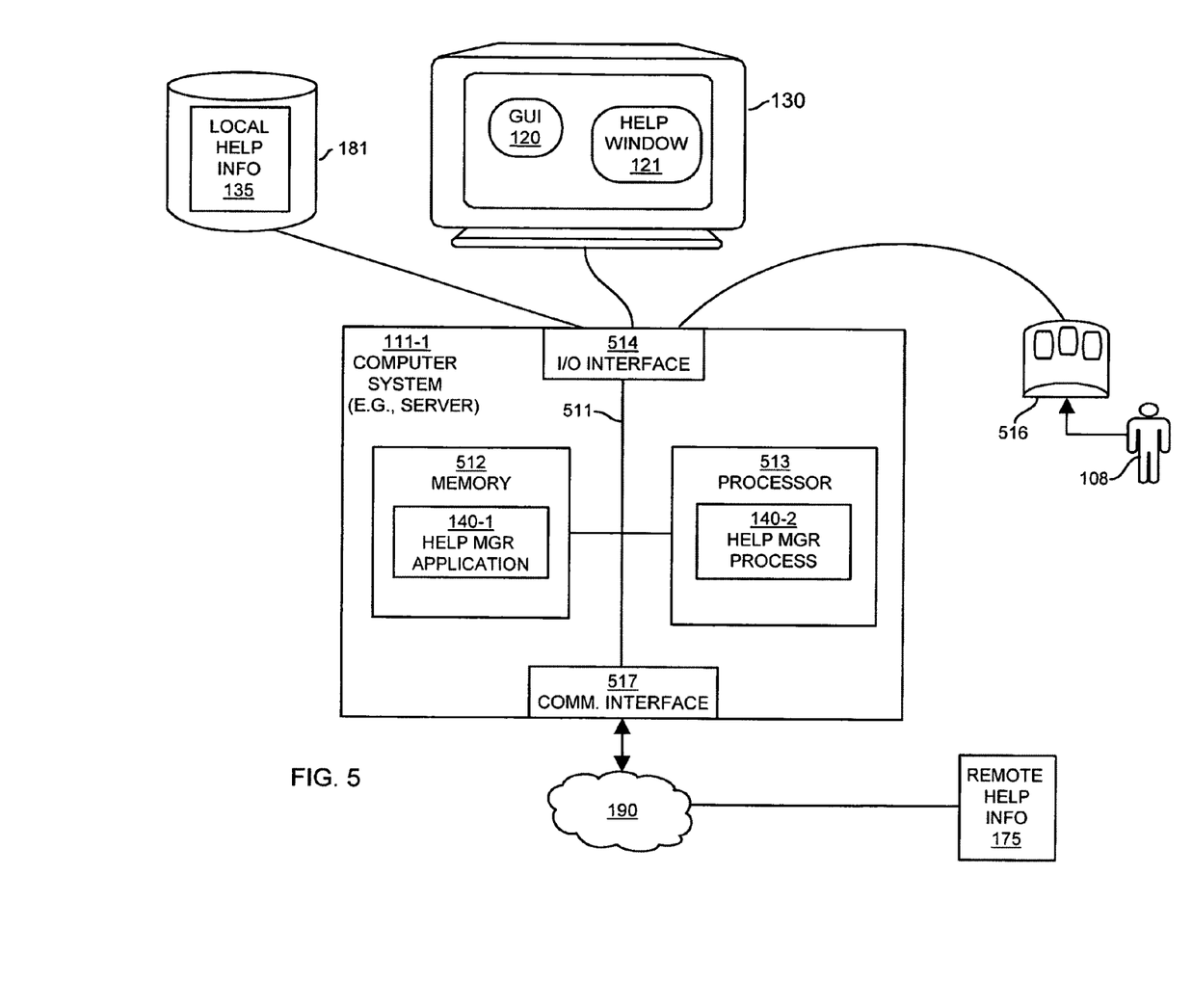
FIG. 5 is a diagram of an example architecture for executing software code according to embodiments herein.

FIG. 5 is a block diagram of an example architecture of a respective computer system 111-1 (e.g., a server) for implementing help manager 140 (e.g., help manager application 140-1 and/or help manager process 140-2) according to embodiments herein. Computer system 111-1 (and each of other computer systems 111 in computer environment 100 of FIG. 1) can be a computerized device such as a personal computer, workstation, portable computing device, console, network terminal, processing device, network device, etc.

Note that the following discussion provides a basic embodiment indicating how to carry out functionality associated with the help manager 140. It should be noted that the actual configuration for carrying out the help manager 140 may vary depending on a respective application.

As shown, computer system 111-1 of the present example includes an interconnect 511 that couples a memory system 512, a processor 513, I/O interface 514, and a communications interface 517. I/O interface 514 provides connectivity to peripheral devices 516 (if such devices are present) such as a keyboard, mouse (e.g., selection tool), display screen 130, etc. User 108 can provide input to computer system 111-1 to communicate with host application 115 and populate and/or control help window 121. Communications interface 517 enables computer system 111-1 and, more particularly, help manager 140 to communicate over network 190 to retrieve help information from remote sources as previously discussed. I/O interface 514 enables the help manager 140 to retrieve locally stored information (e.g., local help information 135) from repository 181.

As shown, memory system 512 is encoded with help manager application 140-1 that supports help management functions as discussed above and as discussed further below. Help manager application 140-1 (e.g., an plug-in module or software agent application) can be embodied as software code such as data and/or logic instructions (e.g., code stored in the memory or on another computer readable medium such as a disk) that supports processing functionality according to different embodiments described herein. During operation of one embodiment, processor 513 accesses memory system 512 via the use of interconnect 511 in order to launch, run, execute, interpret or otherwise perform the logic instructions of the help manager application 140-1. Execution of the help manager application 140-1 produces processing functionality in help manager process 140-2. In other words, the help manager process 140-2 represents one or more portions of the help manager application 140-1 performing within or upon the processor 513 in the computer system 111-1.

It should be noted that, in addition to the help manager process 140-2 that carries out method operations as discussed herein, other embodiments herein include the help manager application 140-1 itself (i.e., the un-executed or non-performing logic instructions and/or data). The help manager application 140-1 may be stored on a computer readable medium (e.g., a repository) such as a floppy disk, hard disk or in an optical medium. According to other embodiments, the help manager application 140-1 can also be stored in a memory type system such as in firmware, read only memory (ROM), or, as in this example, as executable code within the memory system 512 (e.g., within Random Access Memory or RAM).

In addition to these embodiments, it should also be noted that other embodiments herein include the execution of the help manager application 140-1 in processor 513 as the help manager process 140-2. Thus, those skilled in the art will understand that the computer system 111-1 can include other processes and/or software and hardware components, such as an operating system that controls allocation and use of hardware resources.

Functionality supported by computer system 111-1 and, more particularly, functionality associated with help manager application 140-1 and help manager process 140-2 will now be discussed via flowcharts in FIGS. 6 through 9. For purposes of the following discussion, the help manager 140 (e.g., help manager application 140-1 and/or help manager process 140-2) or other appropriate entity in computer environment 100 generally performs steps in the flowcharts.

Note that there will be some overlap with respect to concepts discussed above for FIGS. 1 through 5. Also, note that the steps in the below flowcharts need not always be executed in the order shown.

Figure 6:
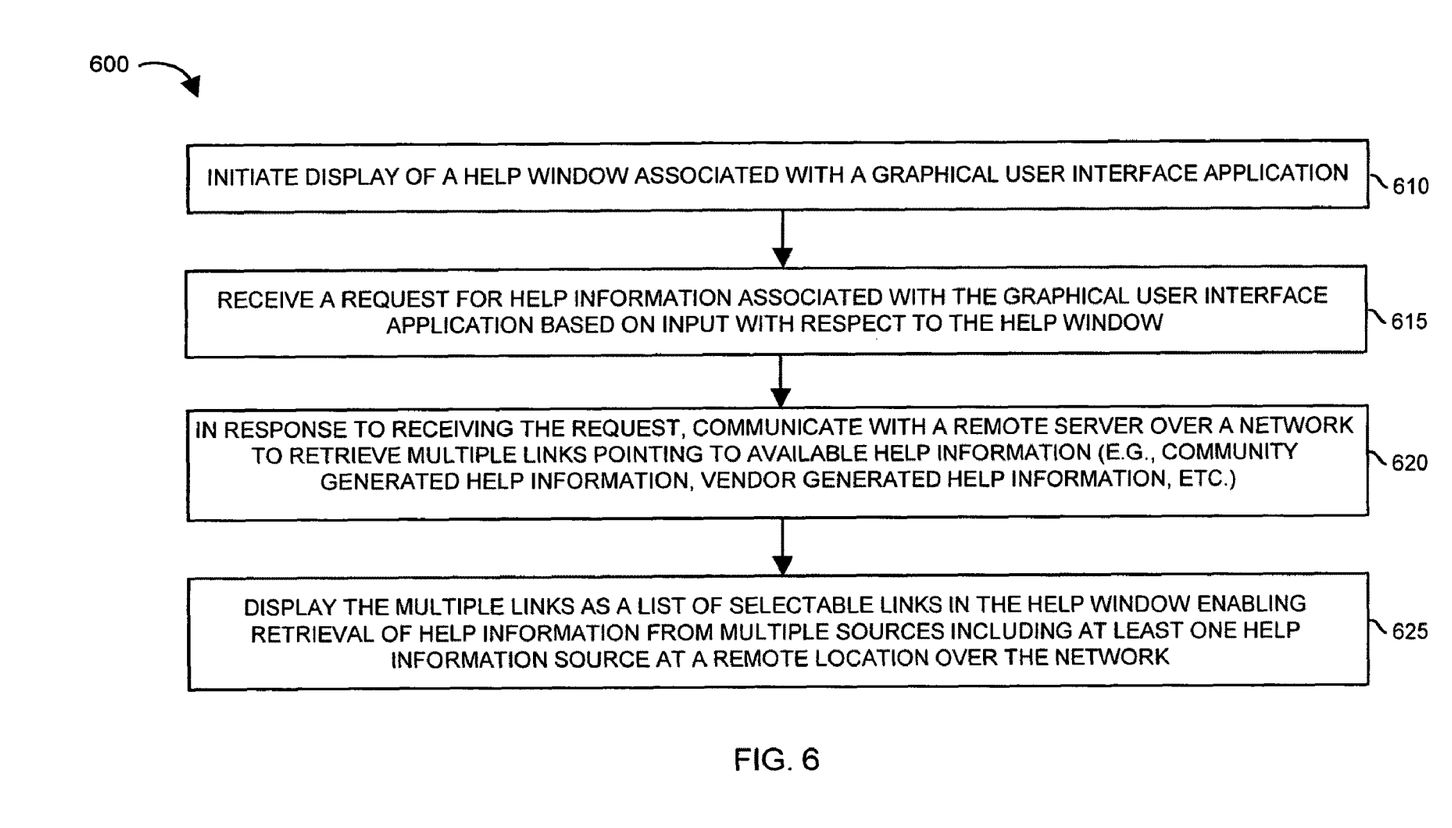
FIG. 6 is a flowchart illustrating an example of a method for retrieving help information links according to embodiments herein.

FIG. 6 is a flowchart 600 illustrating a technique of providing help functionality according to embodiments herein. Note that flowchart 600 of FIG. 6 and corresponding text below will make reference to matter previously discussed with respect to FIGS. 1-5.

In step 610, the help manager 140 initiates display of help window 121 associated with a graphical user interface 120 (e.g., a graphical user interface application).

In step 615, the help manager 140 receives a request for help information associated with the graphical user interface 120 based on input with respect to the help window 121.

In step 620, in response to receiving the request, the help manager 140 communicates with a remote server (e.g., server 150) over network 190 to retrieve multiple links (e.g., Uniform Resource Locators) pointing to available remote help information 175 (e.g., community generated help information 148, vendor generated help information 145, etc.).

In step 625, the help manager 140 displays the multiple links as a list of selectable links (e.g., link 317-1, link 317-2, link 317-3) in the help window 121 enabling retrieval of help information from multiple sources (e.g., repository 181 of local help information 135, server 150, sources 160, and sources 161) including at least one help information source at a remote location over the network 190. In one embodiment, the user 108 can click on the selectable links for viewing help information in the help window 121 or a separate display application such as a browser.

Figure 7:
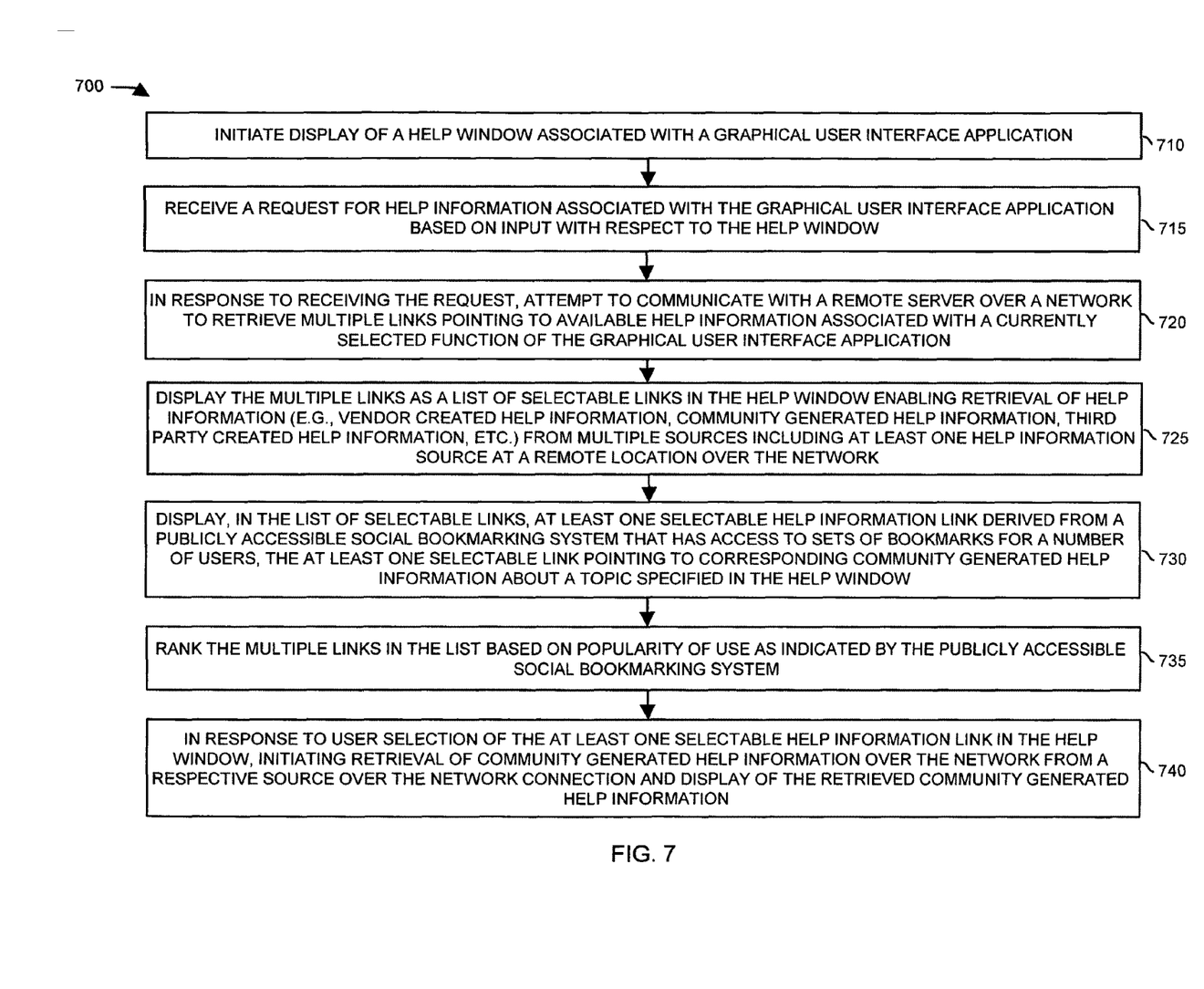
FIG. 7 is a flowchart illustrating an example of a method for providing a respective user access to user generated help information according to embodiments herein.

FIG. 7 is a flowchart 700 illustrating a technique of providing help functionality according to embodiments herein. Note that flowchart 700 of FIG. 7 and corresponding text below will make reference to matter previously discussed with respect to FIGS. 1-5.

In step 710, the help manager 140 initiates display of a help window 121 associated with a graphical user interface 120 on display screen 130. As previously discussed, the host application 115 controls display of graphical user interface 120 on display screen 130.

In step 715, the help manager 140 receives a request for help information associated with the graphical user interface 120 (e.g., host application 115) based on input with respect to the help window 121. For example, the user 108 can click on search button 216 in the help window 121 in order to perform a search for information germane to the selected topic as shown in display field 210.

In step 720, in response to receiving the request (e.g., the user 108 clicking on the search button 216), the help manager 140 attempts to communicate with a remote server 150 over network 190 to retrieve multiple links pointing to available help information associated with a currently selected application function (as identified by a text string shown in display field 210) of the host application 115.

In step 725, the help manager 140 displays the retrieved multiple links (e.g., link information retrieved from server 150) as a list of selectable links 317 in the help window 121 enabling retrieval of help information (e.g., vendor created help information 145, community generated help information 148, third party created help information, etc.) from multiple sources including at least one help information source at remote location over the network 190.

In step 730, the help manager 140 displays, in the list of selectable links 317, at least one selectable help information link derived from a publicly accessible social bookmarking system that has access to sets of bookmarks for a number of users. The at least one selectable link can point to corresponding community generated help information about a topic specified in display field 210 of the help window 121.

In step 735, the help manager 140 can rank the multiple selectable links 317 in the list based on popularity of use as indicated by the publicly accessible social bookmarking system. Accordingly, more helpful information can be available by clicking on selectable links 317 that are higher in the list.

In step 740, in response to user selection of the at least one selectable help information link (e.g., selection of a link 317) in the help window 121, the help manager 140 initiates retrieval of community generated help information 148 over the network 190 from a respective one or more sources and displays the retrieved community generated help information 148 in help window 148 or another display setting such as a browser displayed on display screen 130.

Figure 8:
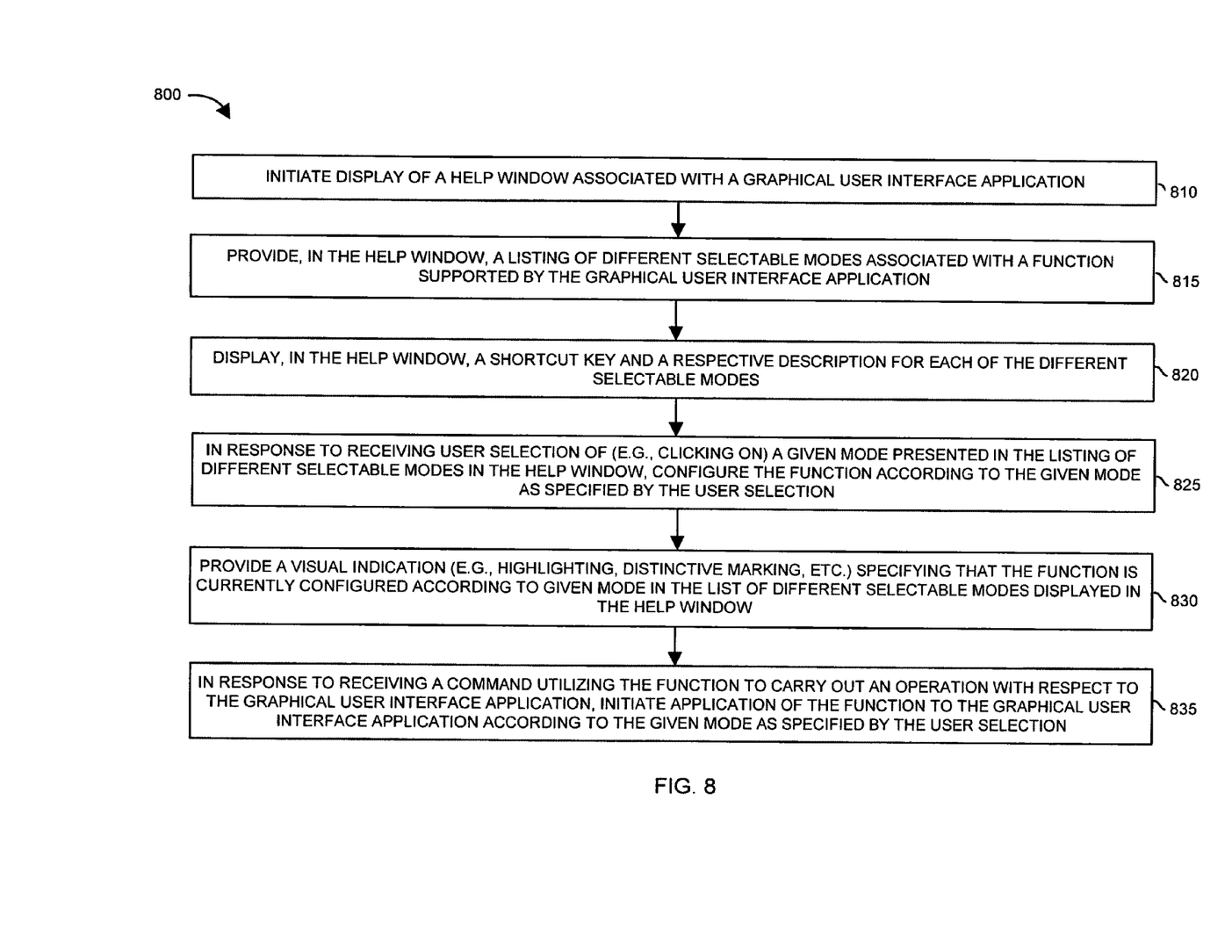
FIG. 8 is a flowchart illustrating an example method in which a user can select different mode settings associated with a graphical user interface application via a help window according to embodiments herein.

FIG. 8 is a flowchart 800 illustrating a technique of providing help functionality according to embodiments herein. Note that flowchart 800 of FIG. 8 and corresponding text below will make reference to matter previously discussed above.

In step 810, the help manager 140 initiates display of help window 121 associated with host application 115.

In step 815, the help manager 140 provides, in the help window 121, a listing of different selectable modes 230 associated with a function (e.g., such as a function as specified by a text string in display field 210) supported by the graphical user interface 120.

In step 820, the help manager 140 displays, in the help window 121, a shortcut key 260 and a respective description 262 for each of the different selectable modes 230.

In step 825, in response to receiving user selection of (e.g., clicking on) a given mode 230 presented in the listing of different selectable modes 230 in the help window 121, the help manager 140 configures the function (as specified by the display field 210) according to the given mode as specified by the user selection. Thus, subsequent actions by the user 108 using the specified function will be performed according to the selected mode.

In step 830, the help manager 140 provides a visual indication (e.g., highlighting, distinctive marking, etc.) specifying that the function is currently configured according to given mode (e.g., selected mode) in the list of different selectable modes 230 displayed in the help window 121.

In step 835, in response to receiving a command utilizing the function (as shown in the display field 210) to carry out an operation with respect to the graphical user interface 120, the host application 115 initiates application of the specified function to the graphical user interface 120 according to the given mode (e.g., selected one of multiple modes 230) as specified by the user selection.

Figure 9:
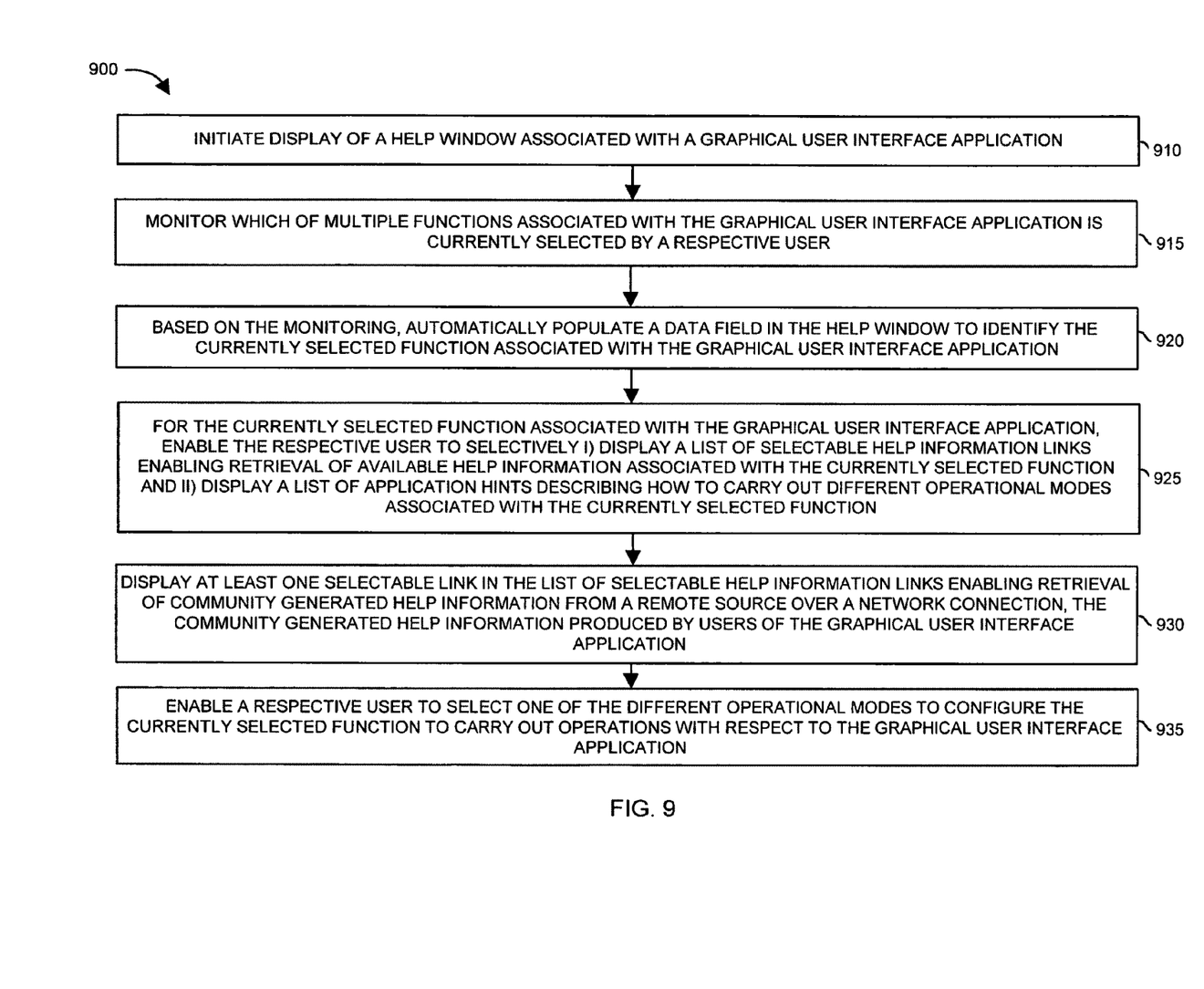
FIG. 9 is a flowchart illustrating an example of a method enabling a user to switch between displaying help information links and displaying application hints according to embodiments herein.

FIG. 9 is a flowchart 900 illustrating a technique of providing help functionality according to embodiments herein. Note that flowchart 900 of FIG. 9 and corresponding text below will make reference to matter previously discussed with respect to FIGS. 1-5.

In step 910, the help manager 140 initiates display of a help window 121 associated with a graphical user interface 120 and host application 115.

In step 915, the help manager 140 monitors which of multiple functions associated with the graphical user interface application is currently selected by a respective user 108.

In step 920, based on the monitoring, the help manager 140 automatically populates a data field (e.g., display field 210) with a corresponding text string in the help window 121 to identify the currently selected function associated with the host application 115.

In step 925, for the currently selected host application function, the help manager 140 enables the respective user to selectively switch between i) display of a list of selectable help information links (e.g., links 315, links 317, etc.) enabling retrieval of available help information associated with the currently selected function and ii) display of a list of application hints (e.g., shortcut keys and mode descriptions) indicating how to carry out different operational modes associated with the currently selected function as specified by the contents of display field 210. Switching can be achieved by clicking on the search button 216 and hints button 217 to view the different information associated as shown in FIGS. 2 and 3.

In step 930, when the list of selectable help information links is displayed in the help window 121, the help manager 140 displays at least one selectable link (e.g., one of links 317) in the list of selectable help information links to enable retrieval of community generated help information 148 from a remote source (e.g., one or more of sources 160, 161, server 150, etc.) over a network 190 connection. As previously discussed, the community generated help information 148 can be produced by one or more users of the host application 115.

In step 935, when the list of application hints is displayed in the help window 121, the help manager 140 enables a respective user 108 to select one of the different operational modes 230 to configure the currently selected function to carry out operations with respect to the host application 115.

Note again that techniques herein are well suited for enabling help manager functionality as described herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   initiating display of a help window associated with a graphical user interface application;
   receiving a request for help information associated with the graphical user interface application based on input with respect to the help window;
   in response to receiving the request:
      communicating with a remote server over a network to retrieve multiple links pointing to available help information; and
      displaying the multiple links as a list of selectable links in the help window enabling retrieval of help information from multiple sources including at least one help information source at a remote location over the network;
   wherein displaying the multiple links as the list of selectable links includes displaying, in the list of selectable links, at least one selectable help information link derived from a publicly accessible social bookmarking system that has access to sets of bookmarks for a number of users, the at least one selectable help information link pointing to corresponding community generated help information about a topic specified in the help window.

2. A method as in claim 1, wherein displaying the multiple links includes:
   ranking the multiple links in the list based on popularity of use as indicated by the publicly accessible social bookmarking system.

3. A method as in claim 1 further comprising:
   in response to selection of the at least one selectable help information link in the help window, initiating retrieval of community generated help information over the network from a respective source over the network connection and display of the retrieved community generated help information.

4. A method as in claim 1, wherein displaying the multiple links includes displaying, in the list of selectable links, a first set of links to help information generated by a vendor of the graphical user interface application and displaying a second set of links to community generated help information generated by third parties that use the graphical user interface application, the method further comprising:
   providing a visual indication to distinguish between the first set of links and the second set of links.

5. A method as in claim 4 further comprising:
   providing a filter function in the help window enabling a user of the graphical user interface application to choose which groupings of selectable links to display in the help window.

6. A method as in claim 1 further comprising:
   initiating communications over the network to attempt retrieval of a help information link associated with a currently selected function of the graphical user interface application for inclusion in the list of selectable links; and
   providing notification in the help window that the attempted retrieval of the at least one help information link failed as a result of an inability to communicate over the network.

7. A method as in claim 1 further comprising:
   for a currently selected tool associated with the graphical user interface application as specified by the help window, enabling a user to choose between displaying the list of selectable links to retrieve remotely available help information associated with the currently selected tool and displaying a list of application hints describing how to implement different operational modes associated with the currently selected tool.

8. A method as in claim 1 further comprising:
monitoring a status of the graphical user interface application;
detecting a currently selected function associated with the graphical user interface application as specified by user input to the graphical user interface application;
automatically populating a portion of the help window with a visual indicator specifying the currently selected function; and
updating the list of selectable links in the help window to include links to community generated help information associated with the currently selected function.

9. A computer program product including a computer-readable medium having instructions stored thereon for processing data information, such that the instructions, when carried out by a processing device, enable the processing device to perform the operations of:
initiating display of a help window associated with a graphical user interface application;
receiving a request for help information associated with the graphical user interface application based on input with respect to the help window;
in response to receiving the request:
communicating with a remote server over a network to retrieve multiple links pointing to available help information; and
displaying the multiple links as a list of selectable links in the help window enabling retrieval of help information from multiple sources including at least one help information source at a remote location over the network;
wherein displaying the multiple links as the list of selectable links includes displaying, in the list of selectable links, at least one selectable help information link derived from a publicly accessible social bookmarking system that has access to sets of bookmarks for a number of users, the at least one selectable help information link pointing to corresponding community generated help information about a topic specified in the help window.

10. A computer program product as in claim 9, wherein displaying the multiple links includes:
ranking the multiple links in the list based on popularity of use as indicated by the publicly accessible social bookmarking system.

11. A computer program product as in claim 9 further supporting operations of:
in response to selection of the at least one selectable help information link in the help window, initiating retrieval of community generated help information over the network from a respective source over the network connection and display of the retrieved community generated help information.

12. A computer program product as in claim 9, wherein displaying the multiple links includes displaying, in the list of selectable links, a first set of links to help information generated by a vendor of the graphical user interface application and displaying a second set of links to community generated help information generated by third parties that use the graphical user interface application, the computer program product further supporting operations of:
providing a visual indication to distinguish between the first set of links and the second set of links.

13. A computer program product as in claim 12 further supporting operations of:
providing a filter function in the help window enabling a user of the graphical user interface application to choose which groupings of selectable links to display in the help window.

14. A computer program product as in claim 9 further supporting operations of:
initiating communications over the network to attempt retrieval of a help information link associated with a currently selected function of the graphical user interface application for inclusion in the list of selectable links; and
providing notification in the help window that the attempted retrieval of the at least one help information link failed as a result of an inability to communicate over the network.

15. A computer program product as in claim 9 further supporting operations of:
for a currently selected tool associated with the graphical user interface application as specified by the help window, enabling a user to choose between displaying the list of selectable links to retrieve remotely available help information associated with the currently selected tool and displaying a list of application hints describing how to implement different operational modes associated with the currently selected tool.

16. A computer program product as in claim 9 further supporting operations of:
monitoring a status of the graphical user interface application;
detecting a currently selected function associated with the graphical user interface application as specified by user input to the graphical user interface application;
automatically populating a portion of the help window with a visual indicator specifying the currently selected function; and
updating the list of selectable links in the help window to include links to community generated help information associated with the currently selected function.

17. A computer program product as in claim 9 further supporting operations of:
detecting that help information associated with a topic as specified by the request can be found in a local repository and a remote repository over the network;
identifying which of the remote repository and the local repository has newer help information associated with the topic; and
initiating display of a link to one of the local repository and the remote repository to the newer help information.

18. A method as in claim 4, wherein displaying the multiple links includes displaying an additional set of links in addition to displaying the first set of links and the second set of links in the list of selectable links, the additional set of links including a link to at least one syndicated content and pay per view content.

* * * * *